United States Patent [19]

Clements et al.

[11] Patent Number: 4,576,785
[45] Date of Patent: Mar. 18, 1986

[54] REDUCTION IN RATE OF RADIATION EXPOSURE TO EXCORE NUCLEAR REACTOR COMPONENTS

[75] Inventors: Talmage B. Clements; Thomas M. Dresser, both of Raleigh, N.C.

[73] Assignee: Carolina Power and Light Company, Raleigh, N.C.

[21] Appl. No.: 504,248

[22] Filed: Jun. 14, 1983

[51] Int. Cl.⁴ .............................................. G21C 3/32
[52] U.S. Cl. ................... 376/435; 376/287; 376/288; 376/294; 376/917
[58] Field of Search ............... 376/435, 287, 288, 294, 376/917

[56] References Cited

U.S. PATENT DOCUMENTS

| | | |
|---|---|---|
| 3,053,743 | 9/1962 | Cain . |
| 3,145,149 | 8/1964 | Imhoff . |
| 3,185,632 | 5/1965 | Bradley . |
| 3,212,983 | 10/1965 | Kornbichler . |
| 3,238,108 | 3/1966 | Deddens et al. . |
| 3,366,547 | 1/1968 | Gumuchian et al. . |
| 3,466,226 | 9/1969 | Lass . |
| 4,111,747 | 9/1978 | Eck . |

Primary Examiner—Donald P. Walsh
Attorney, Agent, or Firm—Bell, Seltzer, Park & Gibson

[57] ABSTRACT

A nuclear reactor is provided with novel composite assemblies at selected locations at the periphery of the reactor core in order to reduce the rate of radiation exposure to a critical pressure vessel weld. The composite assemblies include a shield zone at a selected location close to the weld and a fuel zone incorporating fissile material. This approach reduces the rate of radiation exposure at at the weld while also contributing to production of power by the core.

34 Claims, 15 Drawing Figures

REDUCTION IN RATE OF RADIATION EXPOSURE TO EXCORE NUCLEAR REACTOR COMPONENTS

BACKGROUND OF THE INVENTION

1. Field of the Invention

The present invention relates to the reduction of the rate of radiation exposure to radiation sensitive elements located outside of a nuclear reactor core. In particular applications the invention relates to the reduction in the rate of radiation exposure to welds in a reactor pressure vessel.

2. Description of the Prior Art

In certain nuclear reactor applications it has proven desirable to reduce the rate of radiation exposure to particular locations external of the reactor core; i.e., "excore locations". An example of this situation occurs in the welds of nuclear reactor pressure vessels that are normally subjected to relatively high levels of neutron flux. It has been found that radiation exposure of the welds over a period time may cause the weld material to become brittle to the extent that the exposure must be reduced in order to allow the reactor to operate to the end of its design life.

Previous designs of fuel assemblies that provide acceptable reductions in the radiation exposure rate result in inordinate penalties with regard to thermal limits, cycle length, operating flexibility and/or power level of the reactor. Prior proposals have included the use of so-called "dummy" assemblies which contain no fuel and the complete removal of fuel assemblies at critical locations.

Other more drastic and costly remedies include (i) annealing the pressure vessel walls after reactor shut down and the removal of all fuel elements and (ii) heating the supply of emergency cooling water in order to reduce thermal shock to the weld should the cooling water be circulated.

Accordingly, there is an acute need for a design that will allow a maximum reduction in the radiation exposure rate in the desired excore locations while minimizing the above-recited penalties in performance and cost.

SUMMARY OF THE INVENTION

The present invention provides a novel and versatile approach commercially suitable for reducing neutron flux at excore locations of a nuclear reactor, while avoiding the various disadvantages heretofore characterizing prior radiation reduction approaches. More particularly, in accordance with the present invention it is possible to reduce the radiation flux at critical excore locations, for example, a pressure vessel weld seam, while concurrently operating the reactor with no appreciable power loss or other detrimental effects. Further, in accordance with certain embodiments of the present invention the radiation reduction may be achieved without redesign of the basic core structure. The versatility provided by the present invention enables the reactor to be modified for the necessary flux reduction in a tailored approach that takes into account the excore location and amount of excore flux reduction required, as well as power generating and other requirements of the core.

Broadly, in one aspect, the present invention is designed for use in a nuclear reactor of the type having a reactor core including a plurality of individually replaceable fuel assemblies. Selected fuel assembly locations at the periphery of the core in proximity to the critical excore location are provided with composite assemblies having a first partial volume defining a shield zone and a second partial volume defining a fuel zone. The shield zone is in the region that provides the greatest potential radiation source to the excore location and is formed from a material of lower fissile concentration than that which is typical for the core. The fuel zone is located in a less critical position with respect to the excore location and includes material of higher fissile concentration than that of the shield zone. Preferred materials for the shield zone include non-fissionable materials and other materials of low fissile inventory. Materials of low fissile inventory may be defined as materials in the range from slightly lower than core average fissile concentration to completely non-fissionable materials. Particularly preferred non-fissionable materials for commercial use are stainless steel, and iron and chromium containing nickel based alloys. The preferred fuel material is enriched uranium, either enriched to the same level as that which is typical for the core or enriched to a level somewhat less than that which is typical.

In preferred embodiments the composite assembly takes the form of a close-packed lattice of vertically disposed cladding tubes enclosing pellets of shield material in the shield zone and pellets of fuel material in the fuel zone. When so configured, the composite assembly may present the same overall dimensions as the standard fuel assemblies of the core, thereby rendering the composite assembly easily insertable and replaceable at selected locations in the core.

Where the critical excore component is a circumferential weld in the reactor pressure vessel, the shield zone may take the form of an axial segment of the composite assembly that is located opposite the weld. It has been found that with typical core designs the composite assemblies need be placed only at certain radial locations at the periphery of the core, preferably at locations that are in the closest proximity to the weld and, therefore, provide the greatest potential source of radiation to the excore location.

In accordance with another aspect of the invention there is provided a method of operating a nuclear reactor so as to control the rate of radiation exposure to an excore location. According to this method peripheral portions of the core that are in close proximity to the excore location are identified and each fuel assembly location that comprises some part of the identified portion is provided with a composite assembly during fuel loading. The composite assembly is inserted into the core in such a fashion that the shield zone thereof is advantageously located so as to provide the desired reduction in radiation flux, while the remainder of the composite assembly includes fissile material for contributing to the power production of the core.

BRIEF DESCRIPTION OF THE DRAWINGS

The invention will be more fully understood from the following detailed description thereof taken in connection with the accompanying drawings, in which.

DETAILED DESCRIPTION OF THE INVENTION

While the present invention will be described hereinafter with particular reference to the accompanying drawings, it is to be understood at the outset of the description which follows that it is contemplated that the present invention may be varied in specific detail while still achieving the desirable characteristics and features of the present invention. Accordingly, the description is to be understood as a broad enabling teaching directed to persons skilled in the applicable arts, and is not to be understood as restrictive.

Figure 1:
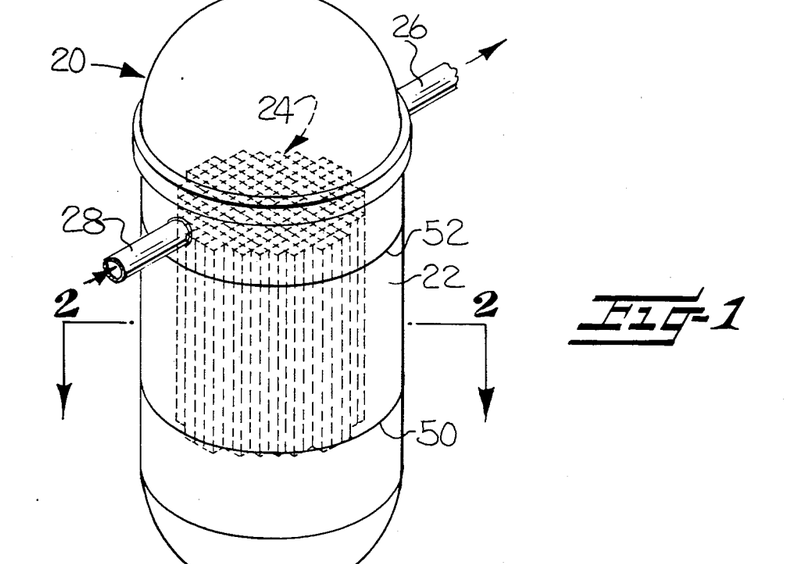
FIG. 1 is a perspective view of a nuclear reactor pressure vessel including a pair of critical circumferential welds, with the reactor core represented by dashed lines.
Figure 2:
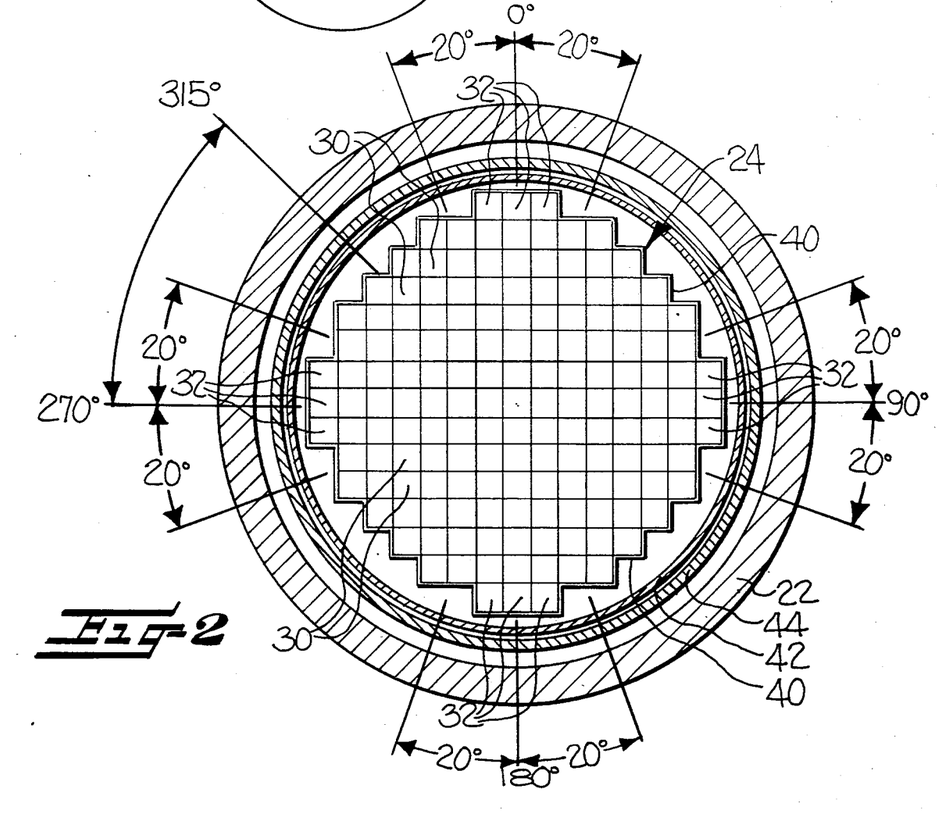
FIG. 2 is a horizontal section view taken substantially along line 2—2 of FIG. 1.

Referring to the drawings, and particularly to FIGS. 1 and 2, there is shown a portion of a nuclear reactor 20 including a cylindrical pressure vessel 22 and a core 24.

The illustrated reactor 20 is a thermal neutron reactor wherein water circulates vertically through the core and heat is transferred to the water. The water is conducted from the core through an outlet conduit 26 and returns via an inlet conduit 28 in a manner well known in the art.

Core 24 consists of a plurality of individually replaceable fuel assemblies that extend vertically for the length of the core. In the illustrated embodiment the fuel assemblies are substantially square in cross section, although other geometries may be used. The fuel assemblies include standard fuel assemblies 30 and twelve composite assemblies 32 located in the four "peripheral flat" regions of the core (FIG. 2), details of which will be described below.

Core 24 is enclosed by four elements: core baffle 40, core barrel 42, thermal shield 44 and the mentioned pressure vessel 22.

Core baffle 40 defines the outer vertical boundary of core 24 and serves to assist in supporting the core in the manner well known in the art. Core barrel 42 and thermal shield 44 are cylindrical members located between the core baffle and the pressure vessel and serve purposes well known in the art.

Pressure vessel 22 is the outermost cylindrical enclosure for the reactor and includes a pair of circumferential welds 50, 52. In the illustrated embodiment, weld 50 is a lower girth weld located near the bottom of core 24, for example, at a height of approximatley 22 inches above the core bottom. Upper girth weld 52 is located near the top of the core, for example, at an elevation approximately 5 inches below the top of the core. Pressure vessel 22 also includes longitudinal weld seams, not shown.

It has been found that exposure to high levels of radiation can cause physical properties of welds 50, 52 to change in a manner detrimental to the overall integrity of the pressure vessel. More particularly, when the entire core 24 is made up of standard fuel assemblies, certain arcs of the welds are exposed to undesirably high rates of radiation exposure from fast neutrons that may cause the weld material to become brittle.

Figure 3:
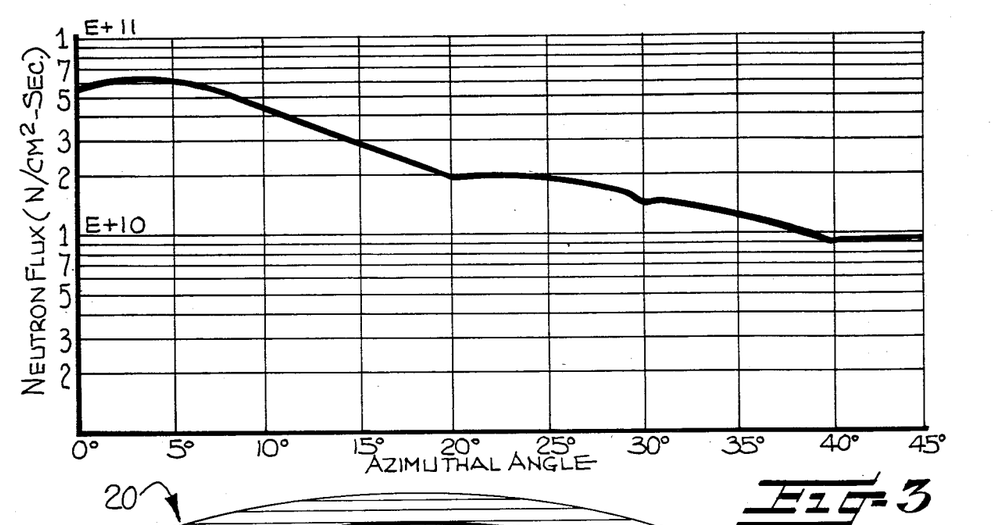
FIG. 3 is a graph showing the azimuthal distribution of neutron flux at the pressure vessel inner surface of a reactor as shown in FIG. 1 in a situation where the entire core is made up of standard fuel assemblies, with the 0° indication coinciding with any of the four symmetric positions 0°, 90°, 180°, 270° of FIG. 2.

The rate of radiation exposure to the pressure vessel when the core contains standard fuel is illustrated in the semi logarithmic scale of FIG. 3. The scale illustrates the neutron flux in each octant of the pressure vessel, for example, the octant illustrated in FIG. 2 as the 270°–315° octant. The scale clearly shows that the neutron flux is greatest at the 0°, 90°, 180° and 270° locations and decreases substantially away from these locations. In accordance with the present invention, it has been found that it is desirable to reduce the rate of radiation exposure at the welds within an arc spanning ±20° from each of the 0°, 90°, 180° and 270° locations. Core designs utilizing standard fuel assemblies throughout provide sufficiently low radiation exposure rates at all other locations.

In accordance with the present invention, it has been found that the greatest radiation source to the welds in the mentioned ±20° span areas is provided by the three outermost or peripheral fuel assemblies located at the 0°, 90°, 180° and 270° locations. More particularly, the greatest source is provided by certain axial segments of the twelve assemblies that are located near the elevations of the welds.

Figure 4:
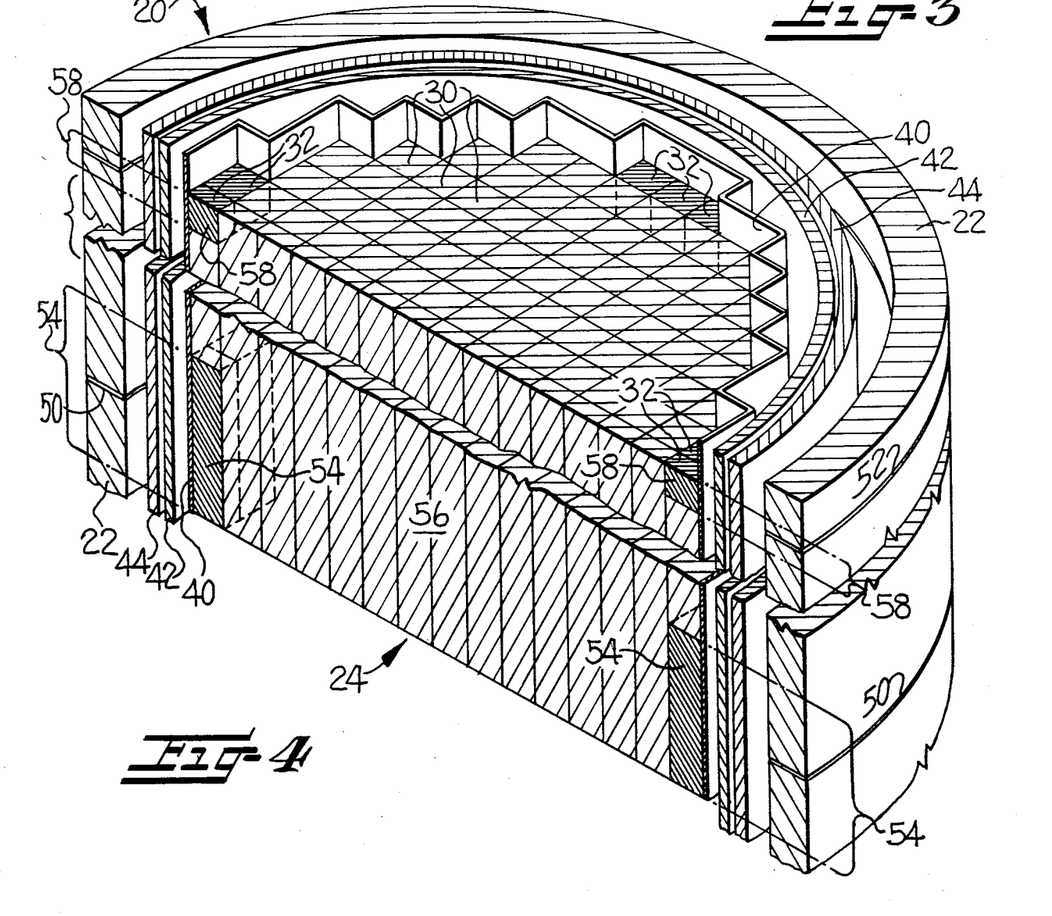
FIG. 4 is an enlarged perspective view looking down at approximately one half of the reactor core of FIGS. 1 and 2 and showing the elements that support and enclose the core.

As best shown in FIG. 4, the twelve fuel assembly locations at the peripheral flats are fueled with composite assemblies 32 each having three axial segments of fuel and shield material. The lower axial segment defines a shield zone 54 that extends upwardly from the bottom of the core and is located opposite circumferential weld 50. The middle axial segment, most of which is broken away in the illustration of FIG. 4, defines a fuel zone 56. The upper axial segment defines a second shield zone 58 that extends downwardly from approximately the top of the core and is located opposite circumferential weld 52.

First and second shield zones 54, 58 include material of lower fissile concentration than that which is typical for the entire core and, therefore, serve to reduce the rate of radiation exposure to the welds. As explained in more detail below, the shield zone material may take the form of a non-fissionable material or a material such as natural uranium or slightly enriched uranium.

Fuel zone 58 includes material of higher fissile concentration than that of the shield zones. Thus, fuel zone 58 may include fissile material such as enriched uranium as found in the remainder of the core, or enriched uranium that is enriched to a level somewhat less than that typical for the core.

Figures 5, 5A, 5B, 6:
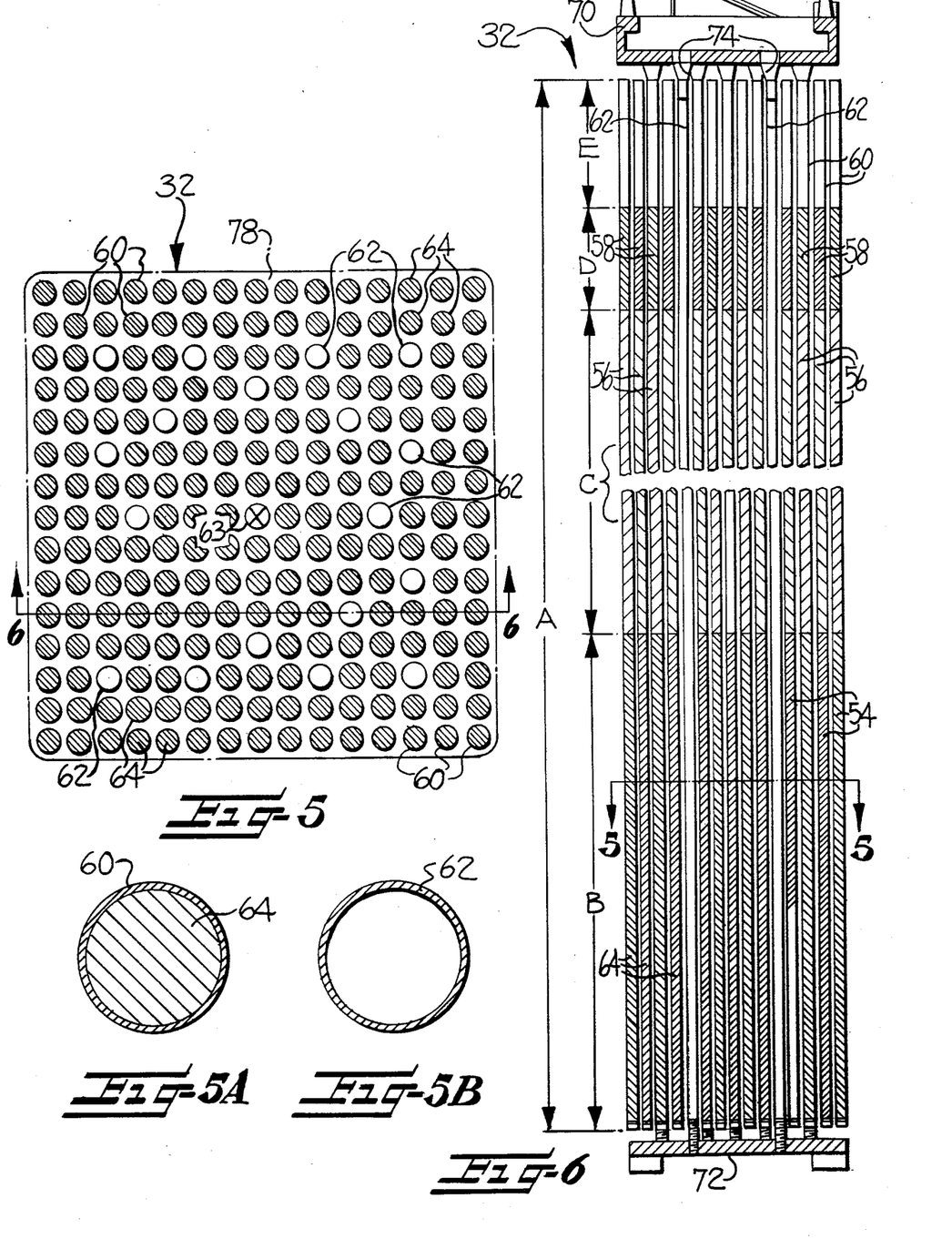
FIG. 5 is a section view taken substantially along line 5—5 of FIG. 6 and showing a composite assembly of the invention as incorporated in the exterior portions of the core for reducing the rate of radiation exposure at the circumferential welds of the pressure vessel.
FIG. 5A is an enlarged section view of one of the cladding tubes and enclosed pellet of FIG. 5.
FIG. 5B is an enlarged view of one of the control rod tubes of FIG. 5.
FIG. 6 is a section view taken substantially along line 6—6 of FIG. 5.

With reference to FIGS. 5 and 6, the description will now turn to a more detailed description of a preferred structure of the composite assemblies 32. Each composite assembly 32 includes a plurality of cladding tubes 60, several control rod tubes 62 that are distributed among the cladding tubes and an instrument guide tube 63. Tubes 60, 62 and 63 extend substantially the entire length of assembly 32.

Each cladding tube 60, one of which is shown in the enlarged view of FIG. 5A, provides a vertical opening into which cylindrical pellets may be inserted and then sealed. The control rod tubes, FIG. 5B, define vertical openings that are left clear for insertion of control rods, not shown. The instrument guide tube 63, similar in structure to the control rod tubes, defines a vertical opening left clear for the insertion of radiation measurement instruments (not shown).

As best shown in FIG. 6, cladding tubes 60 of composite assembly 32 include shield pellets 64 in the first shield zone 54. Fuel zone 56 includes fuel pellets 66 having a higher fissile concentration than that found in the shield zones. Second shield zone 58 includes further shield pellets 67.

The uppermost axial segment 68 includes spring members (not shown) that serve to exert a downward compressive force on the pellets in the manner well known in the art. The cladding tubes 60 are sealed at the top and bottom to maintain isolation from the reactor coolant.

As shown in FIG. 6, the cladding tubes 60 and control rod tubes 62 are supported by upper and lower tie plates 70, 72, respectively. Contoured guide openings 74 are provided in the upper tie plate 70 for guiding control rods into the control rod tubes when necessary.

The close-packed lattice of cladding tubes 60 and control rod tubes 62 is maintained in the manner known in the art by supports in the form of a plurality of horizontal grid straps 78 (only the perimeter of which is shown in FIG. 5) that are spaced at vertical intervals throughout the composite assembly.

In accordance with a preferred embodiment of the invention, the overall height A of cladding tubes 60 is on the order of 152 inches, with lower shield zone 54 approximatley 36 inches (dimension B), fuel zone 56 approximatley 102 inches (dimension C), upper shield zone 58 approximately 6 inches (dimension D) and the zone encompassing the springs approximately 8 inches (dimension E). Further, in accordance with the preferred embodiment shield pellets 64 in the lower shield zone are formed from a non-fissionable material such as nickel based alloys, iron based alloys, chromium based alloys, zirconium based alloys and water. The most preferred materials are reactor grade stainless steel, and chromium and iron containing nickel based alloys (for example, certain of the INCONEL brand nickel based alloy materials manufactured by The International Nickel Company, Inc. of New York, N.Y.). The fuel pellets 66 in fuel zone 56 preferably are formed from enriched uranium, most preferably enriched at a level below that which is typical for the entire core 24. The shield pellets 67 in the upper shield zone 58 preferably are formed from uranium having a natural fissile concentration.

The foregoing preferred materials offer advantages for the particular application set forth. The lower girth weld 50, because of its positioning, is exposed to a greater rate of radiation than the upper girth weld 52. Therefore, the lower shield zone 54 is longer and is made from a non-fissionable material that is an effective reflector/attenuator of neutrons. The shorter shield zone 58 is formed from a heavy metal, natural uranium, that provides a small local source but is capable of adequately shielding upper weld 52. The fuel material in fuel zone 56, while it may be enriched uranium as found in the remainder of the core, is chosen as a less enriched uranium for two reasons—first, it serves to reduce the source somewhat in the proximity of circumferential welds 50, 52 and, second, it provides a reduced source throughout the length of the assembly that reduces the rate of radiation exposure to the closest of the longitudinal welds that are axially spaced around the pressure vessel. It will be appreciated, however, that the particular materials used in the fuel and shield zones, as well as the geometries of the zones, may be varied to achieve the desired effect of providing a shield to some localized excore area while still contributing to the production of power.

It will be appreciated that in the preferred embodiment assemblies 30 comprising the remainder of the core have a structure similar to that of the composite assemblies 32 except that the cladding tubes below the springs are substantially filled with enriched uranium of the fissile concentration typical for the core.

Because of the similarity in the cladding tubes and the spacing therebetween in both the standard fuel assemblies 30 and composite assemblies 32, the water flow characteristics through each type of assembly will be substantially the same. Stated differently, the geometry of the wetted envelope of each composite assembly 32 is substantially similar to that of the standard fuel assemblies 30.

As commonly used in the industry, and as used hereinafter, the combination of a cladding tube and the materials enclosed therein is referred to as a "pin". While the pin structure is primarily disclosed herein as the structure for containing the fuel and shield materials, it will be appreciated that other arrangements for both the standard fuel assemblies and composite assemblies may be used without departing from the scope of the invention. For example, other forms of vertically oriented fuel elements and shield elements may be used. Further, the term "pellet" has been used to designate the form of those fuel and shield materials that are contained in the cladding tubes. While the discrete material pieces may be provided in many different sizes and shapes, all such contained material peices are referred to herein as "pellets".

Figure 7:
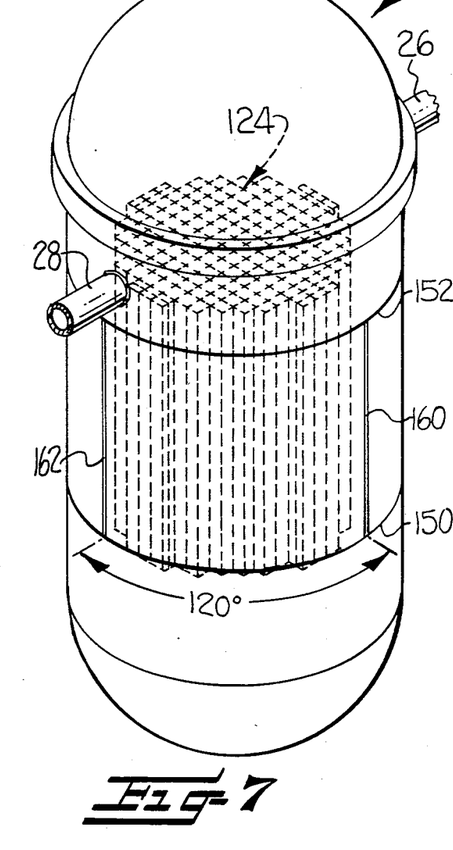
FIG. 7 is a view similar to FIG. 1, but showing a reactor pressure vessel with a critical longitudinal weld.
Figure 8:
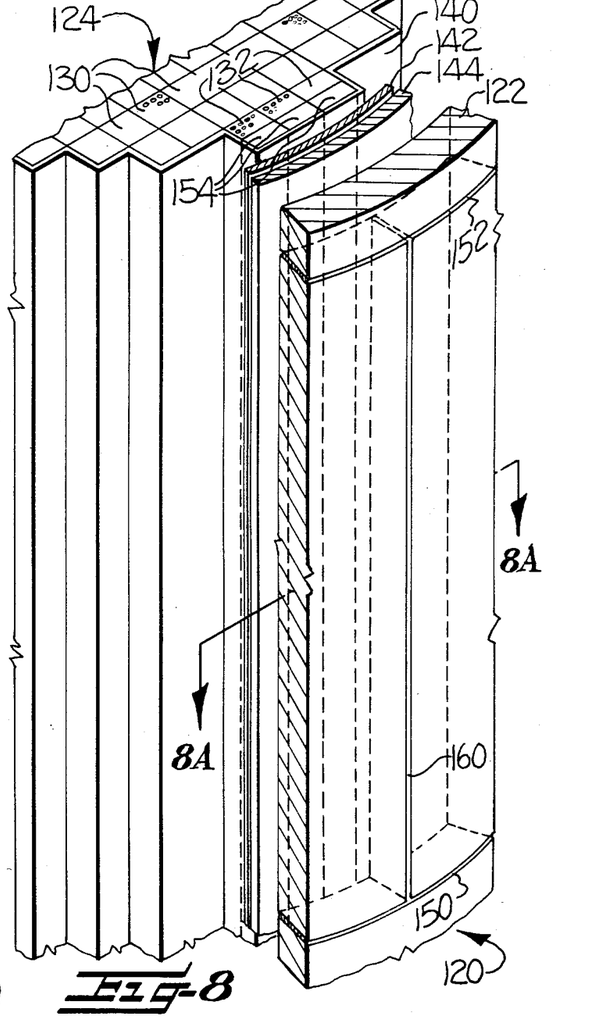
FIG. 8 is an enlarged perspective view of the portion of the pressure vessel of FIG. 7 that includes the longitudinal weld and also showing adjacent portions of the core, thermal shield, core barrel and core baffle.
Figure 8A:
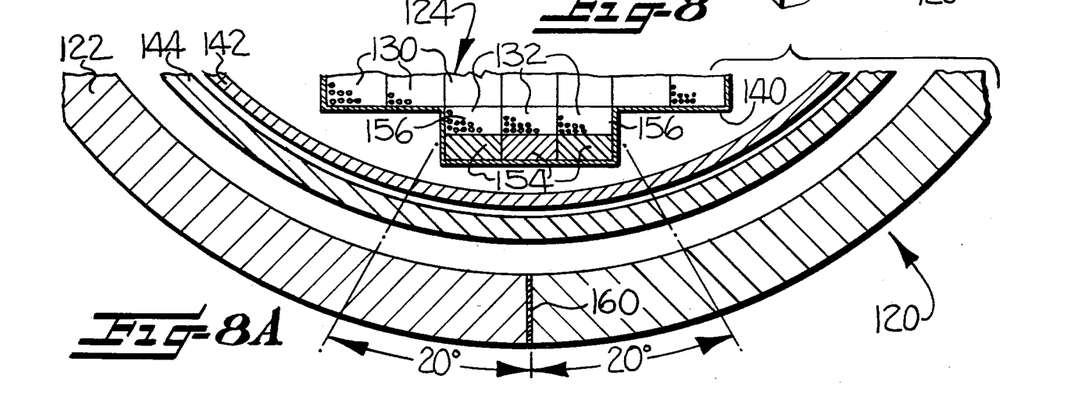
FIG. 8A is a further enlarged section view taken substantially along line 8A—8A of FIG. 8.

An alternative embodiment of the invention will now be described with reference to FIGS. 7, 8 and 8A. FIG. 7 illustrates a portion of a nuclear reactor 120 having a pressure vessel 122 enclosing a reactor core 124 that includes standard fuel assemblies 130 and composite assemblies 132 at least one peripheral flat. As with reactor 20 discussed above, the core is supported and encased by a core baffle 142, a core barrel 142 and a thermal shield 144.

Pressure vessel 122 includes circumferential welds 150 and 152 as well as three longitudinal welds 160, 162 and 164 (not shown). Welds 160, 162, 164 are symmetrically located around the pressure vessel at 120° placements. As shown in FIG. 8A, weld 160 is substantially opposite one of the peripheral flat locations and is well within the ±20° span discussed above in connection with the scale of FIG. 3. Of course, welds 162, 164 are located outside the ±20° spans of the remaining peripheral flats.

If weld 160 is one that requires a reduced rate of radiation exposure, as it is assumed for purposes of this example, according to the present invention a peripheral portion of the core that is in close proximity to weld 160 and provides the greatest potential radiation source to the weld is first identified. In this instance, the core peripheral portion of importance is defined by an outwardly facing partial volume of each of the three fuel assembly locations at the adjacent peripheral flat. As illustrated, the partial volume may define approximately one-half of the volume of each of the three assembly locations and extend for the entire length of the locations.

A composite assembly 132 for placement in each of the three locations may, therefore, include a shield zone 154 occupying the outwardly facing one-half of the assembly and a fuel zone 156 occupying the inwardly facing one-half. While not shown in detail, the structure of zones 154 and 156 may be in the form of cladding tubes and associated supports wherein the shield zone includes pellets of lower fissile concentration than that which is typical for the core and the fuel zone includes pellets of higher fissile concentration than in the shield zone. The selection of particular shield and fuel materials may be made according to characteristics of the core and the shielding requirements of the particular longitudinal weld 160. Other structures for the fuel and shield elements, as discussed above in connection with the first illustrated embodiment, may be used.

In order to maintain quarter-core symmetry, three substantially identical composite assemblies 132 may be located at the peripheral flat directly opposite weld 160. Further, where it is desirable to maintain eighth-core symmetry, assemblies 132 may also be placed at the remaining two peripheral flats at 90° from weld 160.

Figure 9:
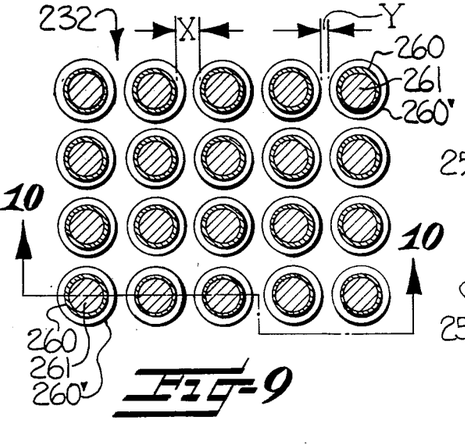
FIG. 9 is a section view taken substantially along line 9—9 of FIG. 10 and showing a portion of an alternative embodiment composite assembly of the invention wherein the shield zone material is formed as enlarged continuations of the fuel pins in the fuel zone.
Figure 10:
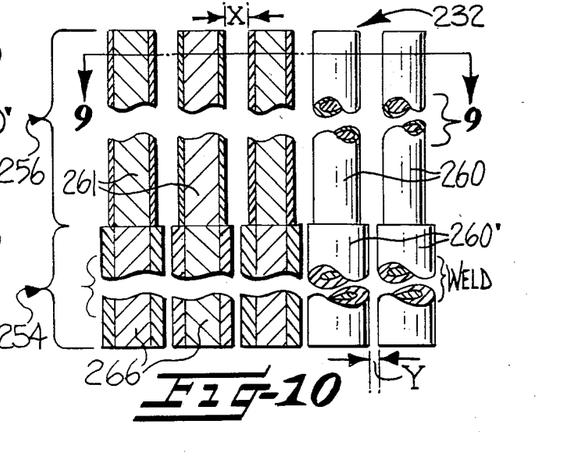
FIG. 10 is a view taken substantially along line 10—10 of FIG. 9.

FIGS. 9 and 10 illustrate some of the pins of an alternative embodiment composite assembly 232. The pins define a fuel zone 256 above a parting line 200 and a shield zone 254 below parting line 200. The fuel zone includes cladding tubes 260 enclosing pellets 261 of enriched uranium and is substantially similar in structure to the fuel zone 60 of FIG. 6. The shield zone 254, which as indicated in FIG. 10 may be opposite a circumferential weld, is an axial segment of fuel assembly 232 that is formed by cladding tubes 260' having an increased wall thickness over that of the cladding tubes 260 in the fuel zone. Cladding tubes 260' contains shield pellets 266 formed from, for example, non-fissionable material.

The spacing between cladding tubes 260 in fuel zone 256 defines a gap width X, while the smaller spacing between the cladding tubes 260' in shield zone 254 defines a smaller gap width Y. Thus, the wetted envelope of composite assembly 232 provides a decreased coolant fluid flow in the shield zone 254, as compared to that found in fuel zone 256 and the standard fuel assemblies in the remainder of the core. This closer packed lattice in shield zone 254 and the resultant reduced coolant flow is desirable in many applications to direct the coolant flow to "hotter" areas of the core where more heat is being generated, as opposed to the "cooler" areas defined by the shield zone. Stated simply, the coolant flow is directed where it is needed so as to reduce the likelihood of hot and cool spots within the core. Further, it will be appreciated that in most applications the fuel zone of the composite assembly will be "cooler" than the remaining assemblies in the core, so that the diameter of the entire pin may be larger than is typical for the remaining assemblies.

The structure illustrated in FIGS. 9 and 10 enables shield zone 254 to incorporate two materials, one material for the cladding 260' and a second material for the enclosed pellets 266. In certain applications the ability to use two materials in the shield zone provides an advantageous design. However, it will be appreciated that the increased diameter portions in the shield zone may be formed as solid rods of a single material (not shown) where desirable.

Figure 11:
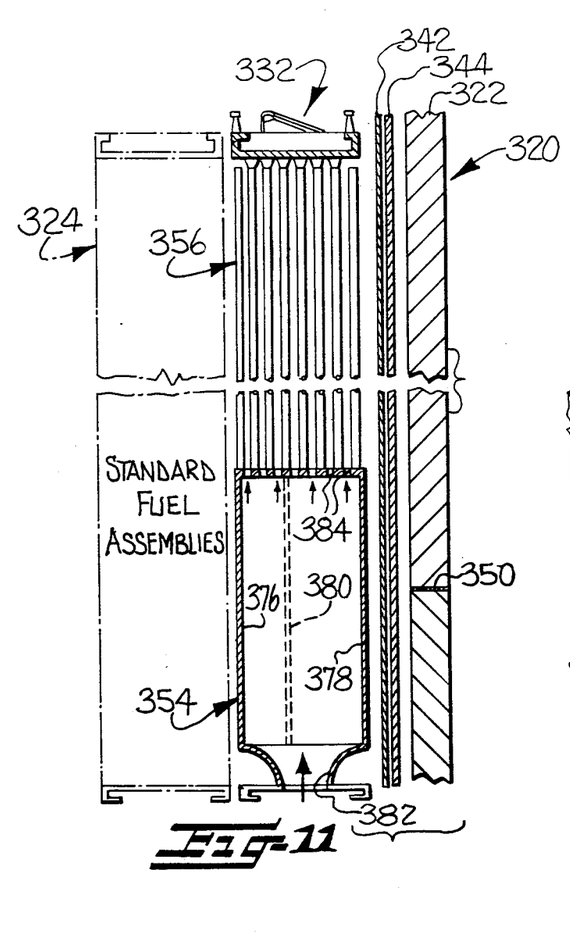
FIG. 11 is a sectional view of a second alternative embodiment composite assembly and adjacent elements wherein the shield material is in the form of a pedestal.
Figure 11A:
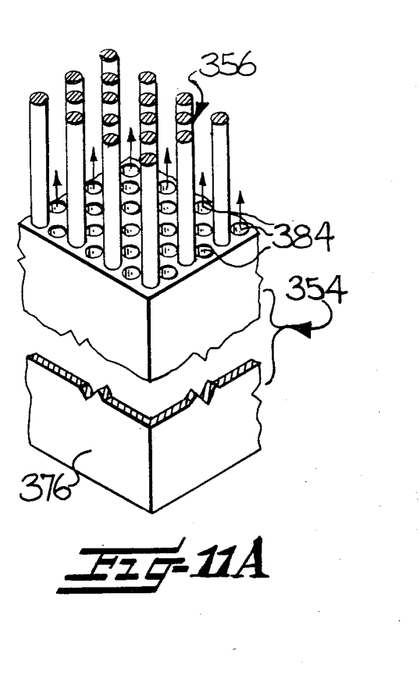
Figure 11A is an enlarged fragmentary perspective view of portions of the pedestal of FIG. 11 and the pins of fuel material resting thereon.

FIGS. 11 and 11A illustrate a portion of a reactor 320 of another alternative embodiment wherein the shield zone is formed as a pedestal 354 at the base of a composite assembly 332. As illustrated, pedestal 354 may be formed as a box-like structure of non-fissionable material that serves to reduce the radiation exposure to an excore location, for example, circumferential weld 352 in pressure vessel 322. The inner and outer plates or walls 376, 378, respectively, of pedestal 354 may be formed from appropriate materials and of appropriate thickness to accomplish the desired radiation reduction. Further plates may be interposed between outer walls 376 and 378, for example, plate 380 shown in dashed lines in FIG. 11.

Composite assembly 372 includes cladding tubes 356 enclosing fuel pellets, for example enriched uranium, in a fuel zone above pedestal 354. The cladding tubes and the enclosed fuel pellets, which are spring loaded as described above in connection with the embodiment shown in FIG. 6, rest upon the upper surface of pedestal 354. In order to provide coolant flow through the pedestal, a fluid inlet 382 is provided at the base thereof and a plurality of fluid flow openings 384 are provided at the upper surface at locations between the fuel pins. By selecting appropriate sizes for openings 384, the amount of fluid flow through the pedestal may be controlled. In certain applications it may be desirable to provide a reduced flow in the shield region by utilizing small openings 384, or no openings at all. It will be appreciated further that a shield zone constructed substantially like pedestal 354 may be positioned at any axial location in a composite assembly of the invention. While not illustrated, such a shield zone may take the form of a solid block, with or without coolant fluid openings therethrough.

In general, the composite assemblies of the invention include support means, for example, the mentioned tie plates and grid straps. The support means define the exterior dimensions of the composite assemblies which are standard to a particular type of nuclear reactor core so as to render the composite assembly individually insertable and replaceable at a peripheral location in the core. Each composite assembly further includes a shield zone and a fuel zone as defined above so as to enable the composite assembly to control the rate of radiation exposure to a localized excore area while also contributing to production of power by the core.

In other aspects, the present invention defines a method of controlling the rate of radiation exposure to a localized area of an excore component that comprises the following steps;

identifying peripheral portions of the core that are in close proximity to the localized area and provide the greatest potential radiation source to the localized area;

identifying each fuel assembly location that includes a partial volume comprising some part of the mentioned peripheral portions of the core; and while the reactor is in a fuel loading mode, fueling the reactor at each identified fuel assembly location with a composite assembly in which the mentioned partial volume thereof includes material of lower fissile concentration than that which is typical for the entire core and in which the remaining volume thereof includes material of higher fissile concentration than that in the partial volume, whereby each composite assembly serves to reduce the rate of radiation exposure to the localized area while also contributing to production of power by the core by providing fissile material for fission reactions.

According to this method the reactor may be considered in a fuel loading mode at the time of the initial start up of the reactor or at any time when the reactor has been shut down for refueling. Further, in carrying out the invention it has been found to be advantageous to fuel the core in such a manner that, for each composite assembly, a substantially identical composite assembly is located at a symmetric core location. This practice will allow the symmetrically located composite assemblies to exchange positions during refueling at the end of a cycle. The symmetry also balances the core for fuel management purposes. "Symmetric core location" as used herein is meant to refer to any symmetric location in the core as defined by standard rotational, reflective or other principles of symmetry known in the art.

SUMMARY OF CERTAIN ADVANTAGES OF THE INVENTION

1. Nuclear reactors incorporating the composite assemblies of the invention are able to reduce the rate of radiation exposure to selected localized areas exterior to the core while also sharing the power generation load of the core, thereby reducing the thermal load of the remainder of the core and providing a neutron source for the remainder of the core. This may be achieved with composite assemblies that have top and bottom supports and overall dimensions such that they fit directly into the core supports which would otherwise support standard fuel assemblies.

2. The composite assemblies may take one of many different forms, depending upon the particular needs of an application. The radiation shielding effects of a composite assembly is dependent on the density and geometry of the chosen shield material. The degree of design variance between a composite assembly and a standard fuel assembly may depend on how much shielding effect is desired. In the case where a maximum of shielding is not desired, a composite assembly can be designed to provide thermal, fluid, mechanical and seismic performance comparable to that of a standard fuel assembly. This feature has the advantage of significantly reducing the amount of expensive redesign that would otherwise be necessary to reduce the excore radiation exposure.

3. Where preservation of the geometry of the wetted envelope of a standard fuel assembly may be an objective in the design of a composite assembly, in order to minimize core reanalysis, pellets of shield material may simply be inserted within the cladding of selected partial volumes of the composite assemblies. For example, where only the bottom axial segment of a fuel assembly need be transformed into shield zone (for example, to reduce the rate of radiation exposure to a circumferential weld), the shield zone may be created by inserting shield material pellets in the cladding up to a predetermined level and then filling the remainder of the cladding with fuel pellets that are typical for the entire core. In these situations the composite assemblies maintain all of the outward characteristics of a standard fuel assembly except for slight weight reduction.

Where preservation of the geometry of the wetted envelope is not a requirement, alternative structural designs may be used. For example, the cross sectional area of the shield material in the shield zone may be increased such that it is greater than that in the fuel zone so as to provide a more densely packed array in the shield zone. This design not only provides better shielding, but also forces coolant flow to the higher power density areas of the core.

4. The choice of materials used in the various zones of the composite assembly may be specifically tailored to work with the characteristics of the reactor core and the local excore environment. For example, where maximum shielding is desirable, the shield zone of the composite assembly may incorporate a non-fissionable shield material which is an effective reflector/attenuator of neutrons. Such a shield zone not only provides effective shielding, but also completely removes any local source of neutrons.

If a large flux reduction is desirable, but a small local source is acceptable, then a heavy metal material with low fissile inventory may be appropriate. For example, depleted uranium, uranium of naturally occurring fissile enrichment, or a very slightly enriched uranium would be appropriate options. These materials provide an enhanced neutron economy as compared to a completely non-fissionable shield material.

5. By the placement of substantially identical composite assemblies at symmetric locations in the core the symmetrically disposed assemblies may be interchanged during refueling at the end of cycles. This procedure can minimize structural distortions caused by large flux gradients, and can flatten radial power distributions in the axial planes containing fuel.

6. The prior art practice of removing fuel assemblies or replacing them with dummies causes extreme increases in power peaking. This is an inevitable consequence of the reduction in effective core size and the increase in surface area to volume of the core. In contrast, by use of the composite assemblies of the invention to produce as much power as is practical in any location, tremendous relief is obtained in thermal margins.

Removal of fuel assemblies or the use of dummy assemblies can cause such severe power peaking that the reactor thermal power must be severely reduced to allow continued operation. Use of the composite assemblies can eliminate or substantially reduce these limitations.

7. The parasitic absorption of neutrons by the shield zones of the composite assemblies does not have a major impact on the neutron economy of the core as a whole because the shield zones inhabit the lower-importance peripheral extremes of the core.

While the present invention has been described in connection with certain illustrated embodiments, it will be appreciated that modification may be made without departing from the true spirit and scope of the invention. For example, while the "excore components" discussed herein have taken the form of welds in pressure vessels, other components of the reactor, or auxillary equipment such as inserted instrumentation, may be protected against high rates of radiation exposure. This and other variations are within the true scope of the invention.

We claim:

1. A nuclear reactor including a reactor core having a plurality of individually replaceable fuel assemblies, said reactor further including an excore component such as a weld, instrumentation, or the like, that defines a localized area requiring a low rate of radiation exposure, the location and geometry of said localized area serving to define certain peripheral portions of said core that are in close proximity to the localized area and provide the greatest potential radiation source to the localized area, said core peripheral portions being formed by a partial volume between about 4% to about 50% of the total volume of each of one or more selected fuel assemblies, the partial volume of each selected fuel assembly defining a shield zone including material of lower fissile concentration than that which is typical for the entire core, and a substantial part of the remaining volume of each selected fuel assembly defining a fuel zone including material of higher fissile concentration than in the shield zone, whereby each selected fuel assembly serves as a composite assembly that reduces the rate of radiation exposure to said localized area while also contributing to production of power by the core by providing fissile material for fission reactions.

2. A nuclear reactor as set forth in claim 1 wherein, for each selected fuel assembly, there is a substantially identical fuel assembly at a symmetric core location.

3. A nuclear reactor as set forth in claim 1 wherein said shield zone material comprises non-fissionable material.

4. A nuclear reactor as set forth in claim 3 wherein said non-fissionable material is selected from the group consisting of nickel based alloys, iron based alloys, chromium based alloys, zirconium based alloys and water.

5. A nuclear reactor as set forth in claim 3 wherein said non-fissionable material is stainless steel.

6. A nuclear reactor as set forth in claim 3 wherein said non-fissionable material is a chromium and iron containing nickel based alloy.

7. A nuclear reactor as set forth in claim 1 wherein said excore localized area is located at a particular elevation opposite a portion of the core and wherein the fuel zone and shield zone of each selected fuel assembly comprise vertically oriented elements having a fissile concentration that varies along the elements according to elevation, with the lowest fissile concentration thereof being located at elevations in the proximity of said excore localized area.

8. A nuclear reactor as set forth in claim 1 wherein the reactor is a thermal neutron reactor in which water circulates vertically through the core and wherein the geometry of the wetted envelope of each selected fuel assembly is substantially similar to that of the other fuel assemblies of the core.

9. A nuclear reactor as set forth in claim 1 wherein the reactor is a thermal neutron reactor in which water circulates vertically through the core and wherein the geometry of the wetted envelope of each selected fuel assembly provides a decreased coolant flow therethrough as compared to the remaining fuel assemblies of the core.

10. A nuclear reactor as set forth in claim 1 wherein each fuel assembly includes a plurality of vertically disposed, cylindrical cladding tubes and wherein the cladding tubes of each selected fuel assembly enclose pellets of non-fissionable material in the shield zone and pellets of fissile material in the fuel zone.

11. A nuclear reactor as set forth in claim 10 wherein each selected fuel assembly includes pellets of non-fissionable material at a first elevation range, pellets of enriched uranium having a fissile enrichment lower than is typical for the entire core at a second elevation range, and pellets of uranium having a natural fissile concentration at a third elevation range.

12. A nuclear reactor as claimed in claim 1 wherein said localized area is a weld in a reactor component enclosing the core.

13. A nuclear reactor as set forth in claim 12 wherein said weld is a longitudinal weld in a pressure vessel enclosing the core, and wherein the shield zone of each selected fuel assembly is an outwardly facing volume of the fuel assembly extending substantially the entire length thereof.

14. A nuclear reactor as set forth in claim 1 wherein the fuel zone material is in the form of vertically oriented, substantially parallel elements arranged in a lattice to provide gaps therebetween for coolant fluid flow, and wherein the shield zone material is formed as continuations of said fuel zone vertical elements.

15. A nuclear reactor as claimed in claim 14 wherein the cross sectional area of the vertical element continuations in the shield zone is greater than that of the elements in the fuel zone, thereby providing a more closely packed lattice in the shield zone.

16. A nuclear reactor as set forth in claim 1 wherein said shield zone material is in the form of plates.

17. A thermal neutron reactor including a reactor core having a plurality of individually replaceable fuel assemblies, a cylindrical pressure vessel enclosing the reactor core, said pressure vessel having a circumferential weld at an elevation opposite a portion of the reactor core, said weld requiring a rate of radiation exposure less than that of the pressure vessel material and serving to define axial segments of certain selected peripheral fuel assemblies, that are in close proximity to said weld and span the same elevation as the weld so as to provide the greatest potential radiation source to the weld, said axial segments having a length on the order of about 6 inches to about several feet, each said selected peripheral fuel assembly comprising a lattice of vertical elements providing gaps therebetween for coolant fluid flow, and the axial segment of each selected peripheral fuel assembly defining a shield zone including portions of the vertical elements formed from material of lower fissile concentration than that which is typical for the entire core, and remaining portions of each selected peripheral assembly defining a fuel zone including portions of the vertical elements containing a higher concentration of fissile material than in the shield zone, whereby the selected peripheral fuel assemblies serve as composite assemblies that reduce the rate of radiation exposure to said weld while also contributing to production of power by the core by providing fissile material for fission reactions.

18. A nuclear reactor as set forth in claim 17 wherein said portions of the vertical elements in the shield zone are continuations of the vertical elements in the fuel zone.

19. A nuclear reactor as claimed in claim 18 wherein the cross-sectional area of the vertical elements in the shield zone is greater than that of the vertical elements in the fuel zone, thereby providing a more closely packed lattice in the shield zone.

20. A nuclear reactor as set forth in claim 18 wherein said vertical elements comprise pins formed by pellets contained in cladding tubes.

21. A nuclear reactor as set forth in claim 17 wherein the shield zone material comprises non-fissionable shield material selected from the group consisting of nickel based alloys, iron based alloys, chromium based alloys, zirconium based alloys and water.

22. A nuclear reactor as set forth in claim 17 wherein said pressure vessel includes two circumferential welds, an upper girth weld near the top of the core and a lower girth weld near the bottom of the core, the said selected peripheral fuel assemblies includes shield zones that span the elevation of each weld.

23. A nuclear reactor as set forth in claim 22 wherein the shield zones at the elevation of the upper girth weld comprise natural uranium and the shield zones at the elevation of the lower girth weld comprise a non-fissionable shield material.

24. In the operation of a nuclear reactor of the type including a reactor core having a plurality of individually replaceable standard fuel assemblies containing fissile material, a method of controlling the rate of radiation exposure to a localized area of an excore component of the reactor, said method comprising:
    identifying peripheral portions of the core that are in close proximity to the localized area and provide the greatest potential radiation source to the localized area;
    identifying each fuel assembly location that includes a partial volume comprising some part of the mentioned peripheral portions of the core; and
    while the reactor is in a fuel loading mode, fueling the reactor at each identified fuel assembly location with a composite assembly in which the mentioned partial volume comprises between about 4% to about 50% of the total assembly volume and includes material of lower fissile concentration than that which is typical for the entire core, and in which the remaining volume thereof includes material of higher fissile concentration than that in the partial volume, whereby each composite assembly serves to reduce the rate of radiation exposure to the localized area while also contributing to production of power by the core by providing fissile material for fission reactions.

25. A method as set forth in claim 24 wherein, for each composite assembly, a substantially identical composite assembly is located at a symmetric core location.

26. A method as set forth in claim 24 wherein the material of lower fissile concentration comprises non-fissionable shield material.

27. A composite fuel assembly useful as a component of a nuclear reactor core and being characterized by its utility in controlling the rate of radiation exposure to a localized excore area while also contributing to production of power by the core by providing fissile material for fission reactions, said composite fuel assembly comprising:
    support means defining exterior dimensions of said assembly that are standard to a particular type of nuclear reactor core and render the assembly individually insertable and replaceable at a peripheral location in the core;
    a shield zone comprising material of lower fissile concentration than that which is typical for the entire core into which the assembly will be inserted, said shield zone material being supported by said support means and occupying a first partial volume of said assembly, the size and location of said first partial volume corresponding to that portion of the assembly which, when the assembly is inserted into its respective core, is in close proximity to the mentioned localized excore area and provides the greatest potential radiation source to the localized excore area;
    a fuel zone comprising material of higher fissile concentration than the shield zone material, said fuel zone material being supported by said support means and occupying a second partial volume of said fuel assembly; and
    said shield zone occupying between about 4% to about 50% of the total shield zone/fuel zone volume.

28. A composite fuel assembly as set forth in claim 27 wherein said first partial volume defines an axial segment of said assembly.

29. A composite fuel assembly as set forth in claim 27 wherein said first partial volume defines an outward face of said assembly extending substantially the entire length thereof.

30. A composite fuel assembly as set forth in claim 27 including vertically oriented elements extending substantially the entire length thereof, said elements having a fissile concentration that varies along the length thereof, with the lowest fissile concentration being located in said shield zone.

31. A composite fuel assembly of the type used as a component of a nuclear reactor core and being characterized by its utility in controlling the rate of radiation exposure to a localized excore area while also contributing to production of power by the core by providing fissile material for fission reactions, said composite fuel assembly comprising:
    a plurality of vertically disposed, cylindrical cladding tubes;
    support means for holding the cladding tubes in a substantially parallel, closely packed arrangement;
    fuel pellets of enriched uranium and shield pellets of non-fissionable shield material encased by said cladding tubes;
    said shield pellets being located in at least one axial segment of the cladding tubes, the size and location of said axial segment having a length being on the order of about 6 inches to about several feet and corresponding to that portion of the composite fuel assembly which, when the assembly is inserted into its respective core, is in close proximity to the mentioned localized excore area and provides the greatest potential radiation source to the localized excore area; and said fuel pellets residing in remaining portions of the cladding tubes.

32. A composite fuel assembly as set forth in claim 31 wherein the non-fissionable shield material is selected from the group consisting of nickel based alloys, iron based alloys, chromium based alloys, zirconium based alloys and water.

33. A nuclear reactor as set forth in claim 32 wherein said non-fissionable material is stainless steel.

34. A nuclear reactor as set forth in claim 32 wherein said non-fissionable material is a chromium and iron containing nickel based alloy.

* * * * *